United States Patent [19]

Krall

[11] Patent Number: 5,599,495
[45] Date of Patent: Feb. 4, 1997

[54] METHOD FOR MOLDING HOLLOW PLASTIC CONTAINER HAVING A FINISH WITH A SMALLER DIAMETER THAN THE BODY OF THE CONTAINER

[75] Inventor: Thomas J. Krall, Toledo, Ohio

[73] Assignee: Owens-Brockway Plastic Products Inc., Toledo, Ohio

[21] Appl. No.: 473,480

[22] Filed: Jun. 7, 1995

[51] Int. Cl.⁶ .......................... B29C 49/22; B29C 49/50
[52] U.S. Cl. .......................... 264/515; 264/536; 264/139
[58] Field of Search .................................. 264/515, 536, 264/139, 151

[56] References Cited

U.S. PATENT DOCUMENTS

| | | | |
|---|---|---|---|
| 3,409,710 | 11/1968 | Kylgis | 264/515 |
| 3,538,208 | 11/1970 | Ohtsuka | 264/151 |
| 4,636,346 | 1/1987 | Gold et al. | 264/139 |
| 5,460,772 | 10/1995 | Ohta | 264/515 |

*Primary Examiner*—Jill L. Heitbrink

[57] ABSTRACT

A hollow plastic container having a finish which has a diameter less than the diameter of the body portion of the container which is made by forming a parison with a neck portion for defining the finish and a body portion and thereafter expanding the body portion to a cross section greater than the cross section of the neck portion. The neck is then trimmed by removing plastic material from the outside of the neck and from the top of the neck to form the finish to the final dimensions. In one form, the prison is a multi-layer parison in order to form a multi-layer plastic container.

4 Claims, 2 Drawing Sheets

METHOD FOR MOLDING HOLLOW PLASTIC CONTAINER HAVING A FINISH WITH A SMALLER DIAMETER THAN THE BODY OF THE CONTAINER

This invention relates to hollow blown containers and particularly to hollow blown containers wherein the finish has a lesser cross section or diameter than the body portion of the container.

BACKGROUND AND SUMMARY OF THE INVENTION

In the manufacture of hollow plastic containers it is common to form a parison into a neck portion and a body portion and blow the body portion outwardly to form the container. It is also common to thereafter complete the container by removing material from the internal diameter of the neck and the top portion. In order to provide such designs, it is sometimes necessary to have a high blow ratio, that is the ratio of the diameter of the body portion divided by the diameter of the neck portion.

In such prior methods, in order to reduce the blow ratio, it has become necessary to mold the container which results in flashing outside of the neck portion. This necessitates a subsequent operation for removing the side flash as well as the operation of reaming or cutting the inside diameter of the finish. An alternative is to make the bottle without flashing outside of the neck by having a high blow ratio. This causes high incidence of rejections due to poor bottle sidewall uniformity and still requires cutting the inside diameter of the finish.

Among the objectives of the present invention are to provide a novel method and resultant article which reduces the blow ratio; which method also avoids cutting through barrier materials in the case of a plastic container with an internal barrier layer; and which avoids the necessity for removal of side flash.

In accordance with the invention, a hollow plastic container is provided having a finish which has a diameter less than the diameter of the finish of the final container. The container is made by forming a parison with a neck portion for defining the finish and a body portion and thereafter expanding the body portion to a cross section greater than the cross section of the neck portion. The neck is then trimmed by removing plastic material from the outside of the neck and from the top of the neck to form the finish to the final dimensions. In one form, the prison is a multi-layer parison in order to form a multi-layer plastic container.

DESCRIPTION

Figure 1:
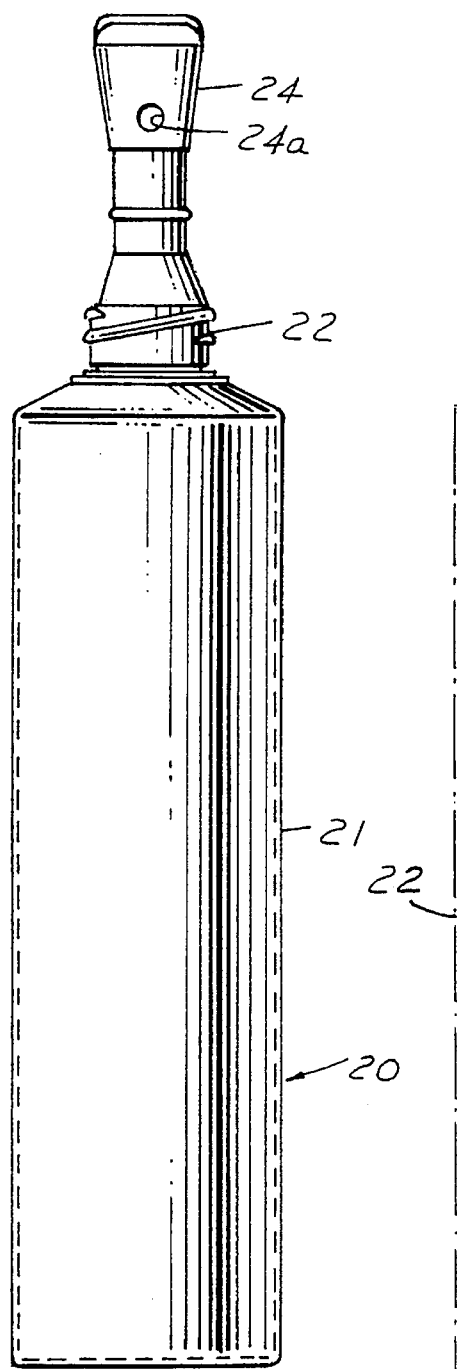
FIG. 1 is an elevational view of a blown container made in accordance with the invention.
Figure 2:
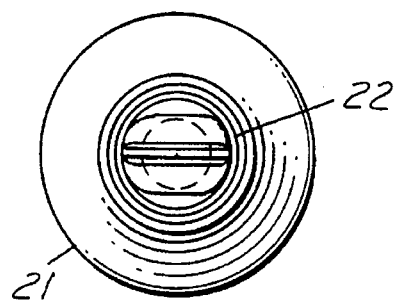
FIG. 2 is a top plan view of the container.

Referring to FIGS. 1 and 2, the container embodying the invention prior to trimming comprises a container 20 having a body portion 21 and a preformed and untrimmed neck portion 22. The upper end of neck portion defines an untrimmed finish 22 having an outer diameter greater than the diameter of the finish in the final article.

The container is made by extruding a tube, closing molds about the tube and blowing the parison within the molds to form a neck portion 25 (FIG. 3), shown by the broken lines when the molds are opened a hollow moil 24 has been provided which includes a hole 24a through which the container has been blown. The untrimmed neck portion 22 is then trimmed along the top 26 and along the line L1, the outer surface 27 to form the neck or finish 25. The inner surface 28 requires no trimming. The hollow plastic container 20 has a finish 25 with a diameter that is less than the diameter of the body portion 21 of the container 20.

Figure 5:
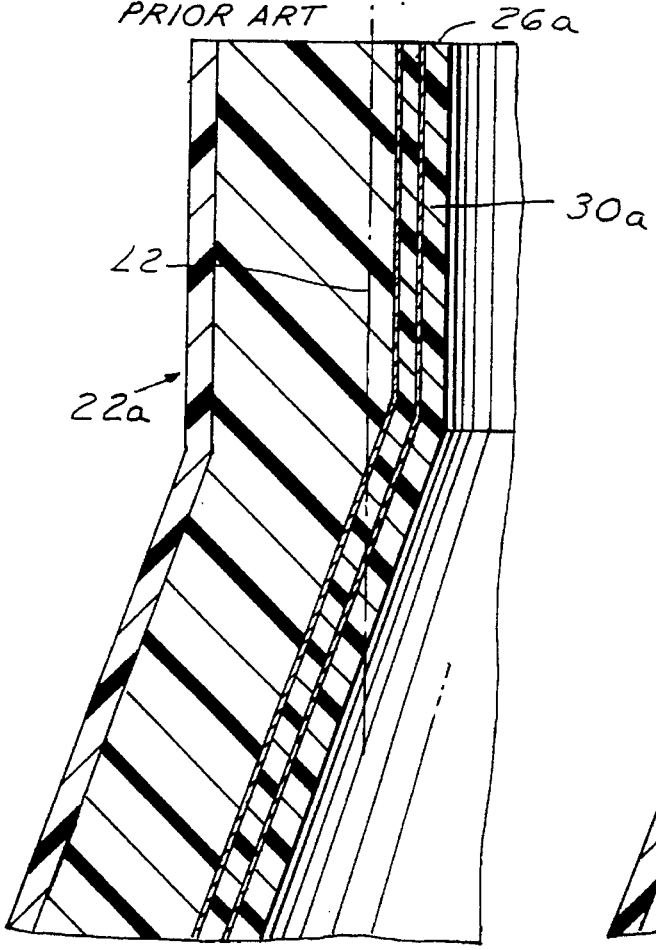
FIGS. 5 and 6 are partly schematic views of the prior art prior to and after trimming respectively.
Figure 6:
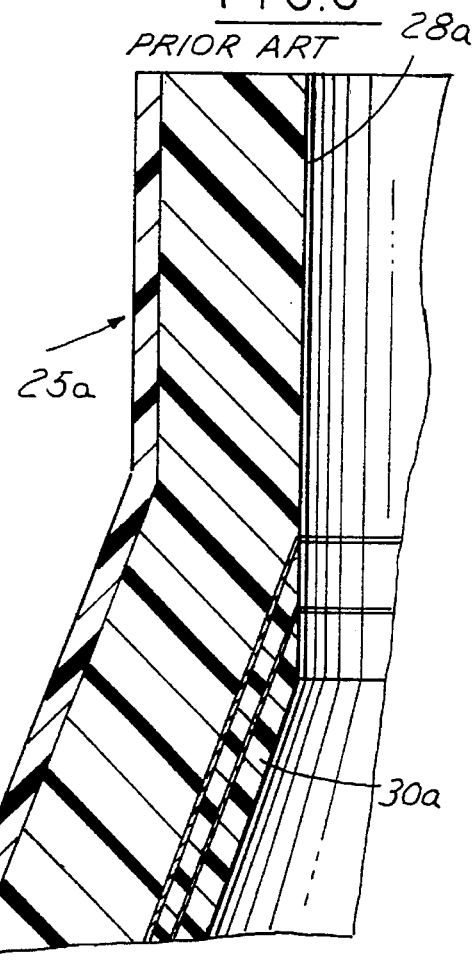

This method may contrast to the prior art as shown schematically in FIGS. 5 and 6 wherein the neck portion 22a is trimmed along the top surface 26a and along the line L2 to form the inner surface 28a.

Figure 3:
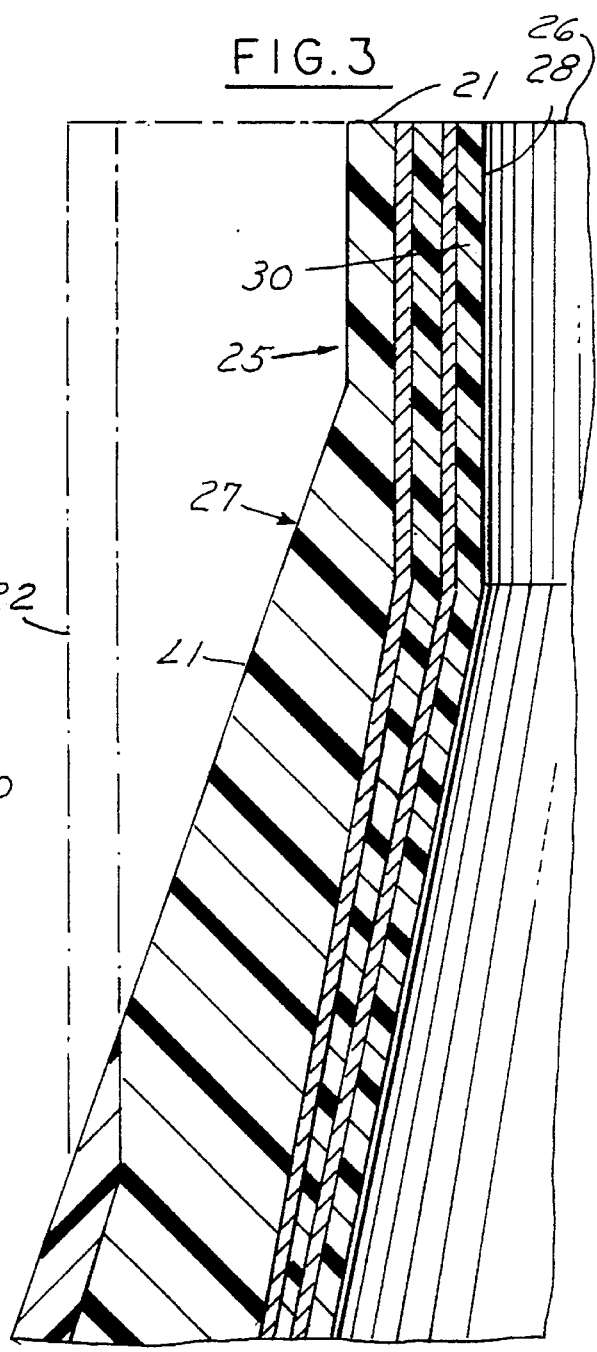
FIG. 3 is a greatly enlarged schematic view of a portion of a blown and trimmed container after completion.
Figure 4:
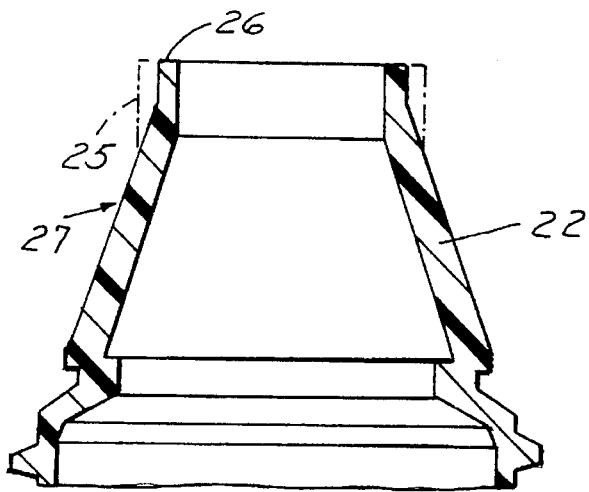
FIG. 4 is a fragmentary enlarged sectional view of a portion of the blown and trimmed container shown in FIG. 2.

The invention has special value wherein the container is made from coextruded parisons having an inner barrier layer 30 (FIG. 3). It can be seen that this inner barrier layer 30 is unaffected. This may contrasted to the prior art method shown in FIGS. 5 and 6 where the barrier layer 30a is cut during trimming such that the barrier layer 30a is removed from the neck portion 25a with the loss of the barrier properties in that area.

It can thus be seen that there has been provided a novel method and resultant article which has a diameter less than the diameter of the finish of the final container. The container is made by forming a parison with a neck portion for defining the finish and a body portion and thereafter expanding the body portion to a cross section greater than the cross section of the neck portion. The neck is then trimmed by removing plastic material from the outside of the neck and from the top of the neck to form the finish to the final dimensions. In one form, the parison is a multi-layer parison in order to form a multi-layer plastic container.

What is claimed is:

1. A method of forming hollow plastic multi-layer container having a finish which is less in diameter than the diameter of the body portion of the container which is made by forming a multi-layer parison with a multi-layer neck portion for defining a finish and a multi-layer body portion, said parison having an inner layer, an outer layer and at least one intermediate layer, thereafter expanding the body portion to a multi-layer cross section greater than the multi-layer cross section of the neck portion, thereafter trimming the neck portion by removing plastic material from the outside of the neck portion and from the top of the neck portion to remove material from the finish and form the finish to the final dimensions while leaving the inner layer of the finish unaffected such that said finish has a diameter less than the diameter of the neck portion and of the body portion.

2. The method set forth in claim 1 wherein said step of forming said parison comprises extruding said parison and said step of expanding said parison comprises enclosing said parison about said parison and blowing said parison outwardly.

3. The method set forth in claim 1 wherein said step of forming said multi-layer parison comprises an inner barrier layer and outer plastic layer and at least one intermediate layer.

4. The method set forth in claim 1 wherein said step of forming said multi-layer parison comprises an inner barrier layer, an outer plastic layer and a plurality of intermediate layers.

* * * * *